Patented Apr. 26, 1949

2,468,633

UNITED STATES PATENT OFFICE 2,468,633

WATER-BASE PRINTING INK

Vincent A. Lauderman, Hamilton, Ohio, assignor to The Champion Paper and Fibre Company, Hamilton, Ohio, a corporation of Ohio No Drawing. Application July 10, 1945, Serial No. 604,301

6 Claims. (Cl. 106—24)

This invention relates to printing inks and more particularly concerns an improved water-base ink for use on printing presses.

The properties generally desired in letter-press inks include high tinctorial values, good wetting, spreading and transfer properties on the press, and stability in the sense of avoiding bacterial decomposition, hardening, "livering," settling out during storage, etc. Prior to the present invention, the only available printing inks combining these properties to the desired degree have been the better grades of oil base printing inks.

It is an object of the present invention to provide a water-base printing ink which possesses a stability as well as wetting, spreading, transferring and dispersing properties comparable with the better grades of oil base letter-press inks. Another object of the invention is to provide a water-base ink capable of forming solid coverages in deep colors and at the same time capable of printing fine half tones without squashing and filling up. A further object of the invention is to provide a water-base ink containing casein or an equivalent protein adhesive which will keep indefinitely without spoilage.

The preferred inks of the present invention are essentially alkaline casein-rosin dispersions of an insoluble pigment in a concentrated aqueous sugar solution, usually containing a suitable hygroscopic agent which may be a polyhydric alcohol such as ethylene glycol, glycerine, sorbitol or the like. In place of the rosin, other naturally occurring resinous materials may be employed such as shellac, dammar, copal, sandarac, and the like, but in general, rosin, either as such or as ester gum or as a modified rosin, is most satisfactory. For convenience I will herein designate the various resinous ingredients of this sort as "natural resins."

In preparing these inks, it is advantageous to first heat the natural resin and the hygroscopic agent, e. g. ethylene glycol, until the natural resin, e. g. rosin is melted. To this solution is added a solution of caustic soda or other alkali. A casein solution made by dissolving casein in alkali is prepared and the natural resin and casein solutions are mixed together. Ordinarily, the amount of natural resin employed is considerably in excess of the casein. To the mixed solutions is added sugar in large excess over the amount of casein used. Finally a pigment is added and the whole mass is put through an ink mill.

This alkaline natural resin-casein combination as herein employed forms an excellent base for the other ingredients of the ink. It prevents "livering" of the ink, a condition which commonly occurs when either ingredient alone is used in water-base inks. It disperses most pigments more perfectly than either agent alone and it firmly bonds the pigment to the paper. Moreover, it appears to bring about a perfect blending of the sugar and hygroscopic agent to produce a homogeneous vehicle excellently adapted for the incorporation of a wide variety of known pigments.

Although casein inks are notoriously prone to bacterial spoilage, the presence of the natural resin renders these inks permanently stable. Other protein adhesives such as soy bean protein may be substituted for the casein in many cases.

The relative proportions of pigment, natural resin, and protein adhesive to be used may vary over a wide range depending on the particular pigment and resin employed, the tack, consistency, and other properties desired for any given requirement. Thus I have obtained satisfactory results using from 3 to 40 parts of casein and from 3 to 100 parts of rosin per 100 parts of pigment (by weight).

If desired a suitable soap, e. g., sodium oleate may be incorporated into the ink.

The sugar or equivalent substance is an essential ingredient since in combination with the casein and natural resin it greatly improves the wetting, spreading and transfer properties of the ink on the press and thus enables a more perfect application of the ink to the surface to be printed. Ordinarily from 2 to 7 times as much sugar as casein is used, but somewhat larger or smaller amounts can sometimes be employed. Ordinarily I prefer to use sucrose, although other sugars such as for example dextrose, lactose and the like act similarly and can be substituted for sucrose if desired.

The total solids of the ink may be varied over a fairly wide range, depending on the particular consistency most desired for any particular job. I have obtained good results with inks of from 54% to 83% total solids. These inks have the consistency of thicker or thinner pastes just as in the case of oil base letter-press inks. If desired a much thinner ink suitable for rotogravure printing may be prepared by reducing the total solids to any required degree.

My improved inks always show an alkaline reaction, commonly having a pH of from about 7.0 to about 10.5. Above a pH of 10.5 there is a tendency for the natural resin to separate out from the ink. It has been my experience that inks of this type commonly have optimum wetting and transfer properties at a pH of about 8.5 with most pigments.

Certain examples of inks embodying the invention and the process of preparing such inks will now be given.

Example 1

Three hundred grams of water-white rosin were added to 276 grams of ethylene glycol and the mixture was heated until the rosin had melted and dissolved in the glycol. Then a solution containing 36 grams of sodium hydroxide and 30 grams of water was added. A casein solution was prepared by warming 60 grams of casein, 145 grams of water, and 7.2 grams of a 33⅓% solution of sodium hydroxide. The two solutions were then mixed and 225 grams of sucrose were stirred in until it was dissolved. 480 grams of dark red pigment were then added and the whole mixture thoroughly incorporated in an ink mill. This ink had a pH of 8.7 and had a consistency of good letter-press printing ink. It behaved very well on the printing press and gave excellent printing results.

Example 2

An ink consisting of 85 parts of carbon black, 15 parts of tungstated Victoria Blue toner, 200 parts of rosin, 40 parts of casein, 145 parts of ethylene glycol, 160 parts of glucose syrup, 91 parts of water, 42 parts of butyl alcohol, and 24 parts of sodium hydroxide was prepared in a manner similar to that described in Example 1. The glucose syrup took the place of the sucrose and the butyl alcohol was added to the ethylene glycol. The ink had the consistency of a letter-press ink, had a solids content of 65%, handled well on the press, and gave deep uniform solids and clear halftones.

Example 3

An ink was prepared in a manner similar to that given in the above examples, which consisted of 100 parts of Lithol Red pigment, 75 parts of ester gum, 25 parts of rosin, 106.5 parts of ethylene glycol, 100 parts of sugar, 7 parts of caustic soda, 16.7 parts of casein, and 88.5 parts of water. The ink spread, wet, and distributed well on the press, and printed excellently.

It will be understood that the invention is not limited to the details of the foregoing examples except insofar as recited in the appended claims.

I claim:

1. A water-base printing ink comprising an aqueous vehicle and, by weight based on 100 parts of pigment, from about 3 to 40 parts of an alkali-dispersible protein, from about 3 to 100 parts of a natural resin, sufficient caustic alkali to substantially saponify the resin, and a sugar in an amount from about 2 to 7 times the amount of protein, the ink having a pH between about 7 and 10.5.

2. A water-base printing ink comprising an aqueous vehicle and, by weight based on 100 parts of pigment, from about 3 to 40 parts of an alkali-dispersible protein, from about 3 to 100 parts of a natural resin, sufficient caustic alkali to substantially saponify the resin, an hygroscopic polyhydric alcohol, and a sugar in an amount from about 2 to 7 times the amount of protein, the ink having a pH between about 7 and 10.5.

3. A water-base printing ink comprising an aqueous vehicle and, by weight based on 100 parts of pigment, from about 3 to 40 parts of casein, from about 3 to 100 parts of rosin, sufficient caustic alkali to substantially saponify the rosin, an hygroscopic polyhydric alcohol, and a sugar in an amount from 2 to 7 times the amount of casein, the ink having a pH between about 7 and 10.5.

4. A water-base printing ink comprising an aqueous vehicle and, by weight based on 100 parts of pigment, from about 3 to 40 parts of an alkali-dispersible protein, from about 3 to 100 parts of a natural resin, and a sugar in an amount from about 2 to 7 times the amount of protein, the ink having a pH between about 7 and 10.5 and a total solids content of from about 50% to 83%.

5. A water-base printing ink comprising an aqueous vehicle and, by weight based on 100 parts of pigment, from about 3 to 40 parts of casein, from about 3 to 100 parts of rosin, sufficient caustic alkali to substantially saponify the rosin, and a sugar in an amount from about 2 to 7 times the amount of casein, the ink having a pH between about 7 and 10.5 and a total solids content from about 50% to 83%.

6. A water-base printing ink comprising an aqueous vehicle and, by weight based on 100 parts of pigment, from about 3 to 40 parts of casein, from about 3 to 100 parts of rosin, sufficient caustic alkali to substantially saponify the rosin, an hygroscopic polyhydric alcohol, and a sugar in an amount from about 2 to 7 times the amount of casein, the ink having a pH of about 8.5.

VINCENT A. LAUDERMAN.

REFERENCES CITED

The following references are of record in the file of this patent:

UNITED STATES PATENTS

| Number | Name | Date |
|---|---|---|
| 422,430 | McCloskey et al. | Mar. 4, 1890 |
| 1,159,337 | Neben | Nov. 2, 1915 |
| 1,404,355 | Evans et al. | Jan. 24, 1922 |
| 2,164,495 | Brown | July 4, 1939 |
| 2,327,597 | Erickson et al. | Aug. 24, 1943 |
| 2,338,151 | Weber | Jan. 4, 1944 |

OTHER REFERENCES

"Soybean Protein Dispersions as Printing Ink Vehicles," Schmutzler et al., Industrial and Engineering Chemistry, November, 1943, pages 1196 and 1202.

Certificate of Correction

Patent No. 2,468,633.

April 26, 1949.

VINCENT A. LAUDERMAN

It is hereby certified that errors appear in the printed specification of the above numbered patent requiring correction as follows:

Column 1, line 25, after the word and period "spoilage." insert the following paragraph:

*Other objects will be apparent from the following description.* column 4, line 23, claim 4, after "resin," insert *sufficient caustic alkali to substantially saponify the resin,*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*